United States Patent
Auerbach et al.

(10) Patent No.: US 7,472,222 B2
(45) Date of Patent: Dec. 30, 2008

(54) HDD HAVING BOTH DRAM AND FLASH MEMORY

(75) Inventors: Daniel Auerbach, San Jose, CA (US); Jorge Campello, Cupertino, CA (US); Frank Rui-Feng Chu, Milpitas, CA (US); Spencer W. Ng, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 335 days.

(21) Appl. No.: 10/963,190

(22) Filed: Oct. 12, 2004

(65) Prior Publication Data

US 2006/0080501 A1     Apr. 13, 2006

(51) Int. Cl.
G06F 12/00     (2006.01)
G06F 13/00     (2006.01)
G06F 13/28     (2006.01)

(52) U.S. Cl. .................................... 711/112; 711/117
(58) Field of Classification Search ................ 711/112
See application file for complete search history.

(56) References Cited

U.S. PATENT DOCUMENTS

| | | | |
|---|---|---|---|
| 5,586,291 A * | 12/1996 | Lasker et al. ............. 711/113 |
| 5,860,083 A * | 1/1999 | Sukegawa ................. 711/103 |
| 5,907,445 A * | 5/1999 | Park et al. .................. 360/72.1 |
| 6,295,577 B1 | 9/2001 | Anderson et al. ........... 711/113 |
| 6,516,426 B1 * | 2/2003 | Forehand et al. ............. 714/24 |
| 6,735,037 B1 | 5/2004 | Tanaka et al. |
| 7,031,092 B2 | 4/2006 | Tanaka et al. |
| 7,127,549 B2 * | 10/2006 | Sinclair ..................... 711/100 |
| 7,143,203 B1 * | 11/2006 | Altmejd ..................... 710/16 |
| 7,302,534 B2 * | 11/2007 | Sinclair ..................... 711/156 |
| 2003/0028733 A1 * | 2/2003 | Tsunoda et al. ............ 711/154 |
| 2004/0064607 A1 * | 4/2004 | Odakura et al. ............. 710/57 |
| 2005/0071561 A1 * | 3/2005 | Olsen et al. ................ 711/118 |
| 2005/0125600 A1 * | 6/2005 | Ehrlich ...................... 711/112 |

OTHER PUBLICATIONS

"Improved Disk Drive Power Consumption Using Solid State Non-Volatile Memory", C. Nicholson. Slide Presention. May 5, 2004.
"Microsoft Proposes Combining Flash, Hard Drives", M. Hachman. ExtremeTech website article http://www.extremetech.com/article2/0,1558,1585978,00.asp. May 6, 2004.

* cited by examiner

Primary Examiner—Hyung S Sough
Assistant Examiner—Gary W Cygiel
(74) Attorney, Agent, or Firm—John L. Rogitz

(57) ABSTRACT

A mobile computing hard disk drive has both a flash memory device and a DRAM device, with the HDD controller managing data storage between disk, DRAM, and flash both when write requests arrive and when the HDD is idle to optimize flash memory device life and system performance.

18 Claims, 3 Drawing Sheets

HANDLING OF WRITE OPERATIONS

HANDLING OF WRITE OPERATIONS

NO I/O REQUEST WAITING FOR SERVICE

HDD HAVING BOTH DRAM AND FLASH MEMORY

I. Field of the Invention

The present invention relates to hard disk drives.

II. Background of the Invention

Hard disk drives (HDD) typically include both disk memory and solid state memory referred to as "cache" for temporarily holding data being transferred between the disks and a host computer.

Conventionally, the cache is Dynamic Random Access Memory (DRAM), a volatile form of memory that can undergo a significant number of write/erase cycles and that has a very high data transfer rate to and from the disks.

With the advent of mobile computers that are battery powered, some HDDs have been provided wherein the disks spin down (stop rotating) when inactive for a period of time. The main purpose of this is to extend the battery life of the computer. When a disk drive is spun down to a standby mode with just the electronics active, battery power is conserved. As recognized herein, however, when data must be written to the disks, the disks must spin up to enable the write to take place, which consumes a significant amount of battery power. If this occurs frequently, no power saving can be attained.

Accordingly, the present invention understands that one solution is to cache the write data to DRAM, and then destage the cached data to disk at some later time. As further understood herein, because DRAM is volatile memory, the data in the DRAM unfortunately can be lost if the HDD loses power before cached data is destaged to the disks.

Accordingly, it has been proposed to replace the DRAM memory with non-volatile flash memory in mobile disk drives. Because flash memory is non-volatile, data that is stored in the flash memory will not be lost if power is lost. Also, flash memory typically has significantly more storage capacity than a similarly-sized DRAM memory, e.g., a small flash memory chip currently can store around 128 MB as compared to a small DRAM chip capacity of around 8 MB, meaning that the period of time that the disk can stay in the standby mode is extended when using flash memory.

As critically recognized herein, however, two drawbacks exist with replacing DRAM with flash memory in a mobile HDD. First, the data transfer rate of a flash memory is much slower than that of a DRAM, which can exceed the drive-host interface bus bandwidth of 100 to 200 MB/s. In contrast, typical data transfer rates of flash memory can be as slow as 2 MB/s. As a consequence, disk drive performance is greatly reduced when using flash memory in place of DRAM. A second drawback is that flash memory has a limited number of write cycles. If the flash memory is used as a conventional write cache, its lifetime can be exhausted rather quickly. While U.S. Pat. No. 6,295,577 describes a method for saving DRAM data to flash memory in the event of a power loss, it fails to understand that the need can arise, depending on circumstances contemplated herein, to also use the flash memory during disk operation and/or when no power has been lost.

SUMMARY OF THE INVENTION

A hard disk drive (HDD) includes at least one disk storing data and a disk controller. The HDD also includes a Dynamic Random Access Memory (DRAM) device and a flash memory device. The disk controller manages data storage by executing logic that includes receiving a write request, and in response determining whether the DRAM device is full. If it is not full, data is written to the DRAM device to satisfy the write request. Otherwise, at least some of the time the logic can include determining whether the flash memory device is full, and if not, destaging data from the DRAM device to the flash memory device and then writing data to the DRAM device to satisfy the write request. If the flash memory device otherwise is full, the disk, if not already spinning, is spun up and data is destaged from the flash memory device to the disk. Then, data can be destaged from the DRAM device to the flash memory device to free up the DRAM device so that data can be written to the DRAM device to satisfy the write request.

If desired, prior to determining whether the flash memory device is full, it can be determined whether the disk is spinning, it being understood that this option may be selected for execution or not by the user in some implementations. In such implementations, if the disk is spinning, data can be destaged from the DRAM device to the disk, and then data is written to the DRAM device to satisfy the write request.

Additionally, when no I/O request is pending, the controller can determine whether the disk is spinning and if not, destage data that is stored in the DRAM device to the flash memory device. Otherwise, if the disk is spinning, the controller destages data that is stored in the DRAM device to the disk. In contrast, if the disk is spinning and the DRAM device is empty, data that is stored in the flash memory device can be destaged directly to the disk.

In another aspect, a chip is configured for placement within a hard disk drive (HDD) having at least one disk. The chip includes means for destaging data from a DRAM device to a flash memory device if the disk is not spinning. The chip also includes means for destaging data from the flash memory device to the disk if the disk is spinning.

In still another aspect, a computer program product is executable by a processing apparatus to manage data storage in a hard disk drive (HDD) having at least one rotatable disk, a non-volatile solid state memory device, and a volatile solid state memory device when power is available to the HDD, both when the disk is spinning and not spinning.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
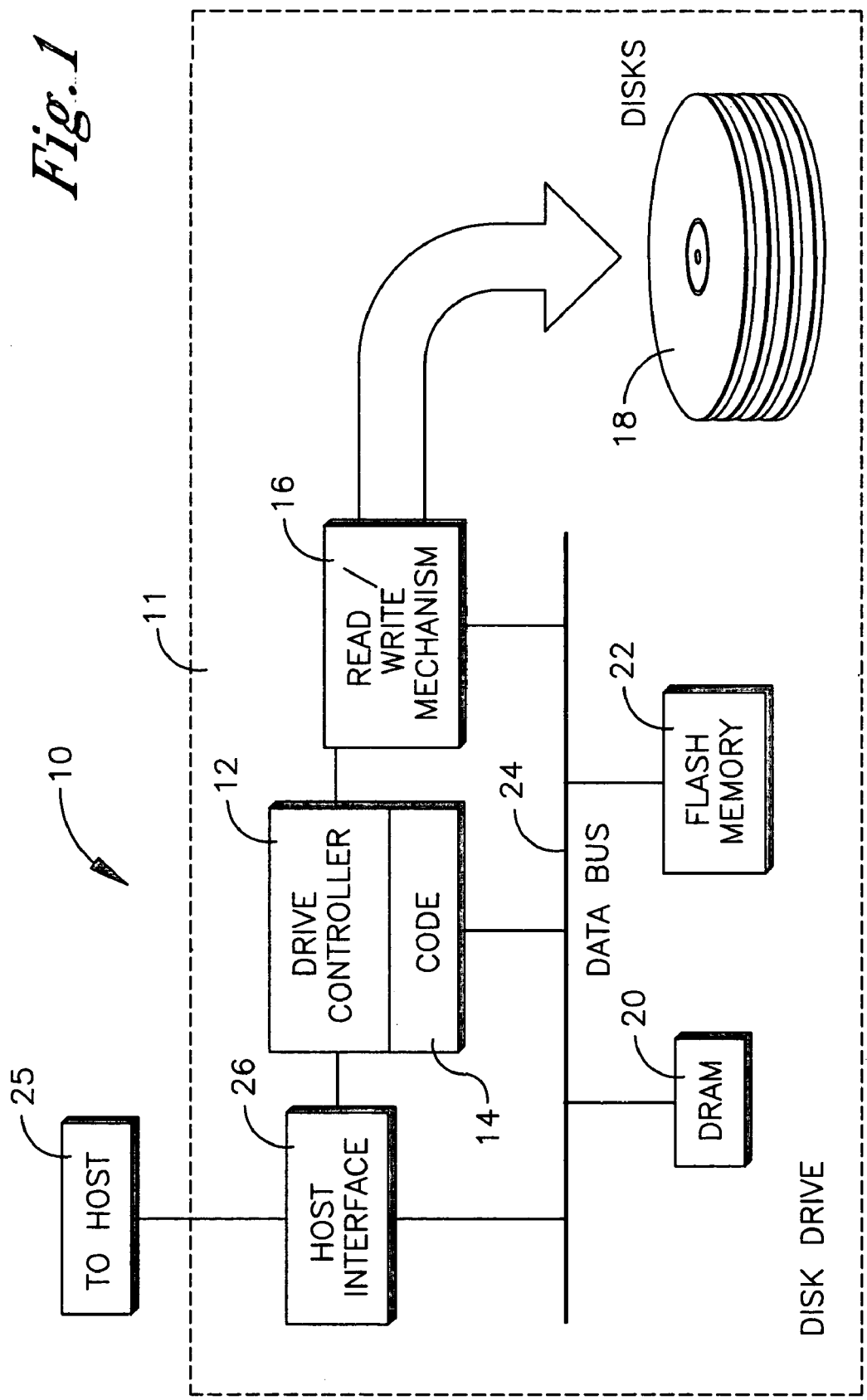
FIG. 1 is a block diagram of the present hard disk drive (HDD)

Referring initially to FIG. 1, a hard disk drive (HDD) is shown, generally designated 10, having a housing 11 holding a hard disk drive controller 12 that can include and/or be implemented by a microcontroller. The controller 12 may access electronic data storage in a computer program device or product such as but not limited to a microcode storage 14 that may be implemented by a solid state memory device. The microcode storage 14 can store microcode embodying the logic discussed further below.

The HDD controller 12 controls a read/write mechanism 16 that includes one or more heads for writing data onto one or more disks 18. Non-limiting implementations of the HDD 10 include plural heads and plural disks 18, and each head is associated with a respective read element for, among other things, reading data on the disks 18 and a respective write element for writing data onto the disks 18.

The HDD controller 12 communicates with both solid state volatile memory, preferably a Dynamic Random Access Memory (DRAM) device 20, and with solid state non-volatile memory, preferably a flash memory device 22, over an internal HDD bus 24. The HDD controller 12 also communicates with an external host computer 25 through a host interface module 26 in accordance with HDD principles known in the art. The host computer 25 can be a portable computer that can be powered by a battery, so that the HDD 10 can be a mobile HDD.

As stated above, the logic disclosed below may be contained in a code storage 14 that is separate from the HDD controller 12, or the storage 14 may be integrated into the controller 12. Or, it may be contained in the read/write mechanism 16, or on the DRAM 20 or flash memory device 22. The logic may be distributed through the components mentioned above, and may be implemented in hardware logic circuits and/or software logic circuits.

Figure 2:
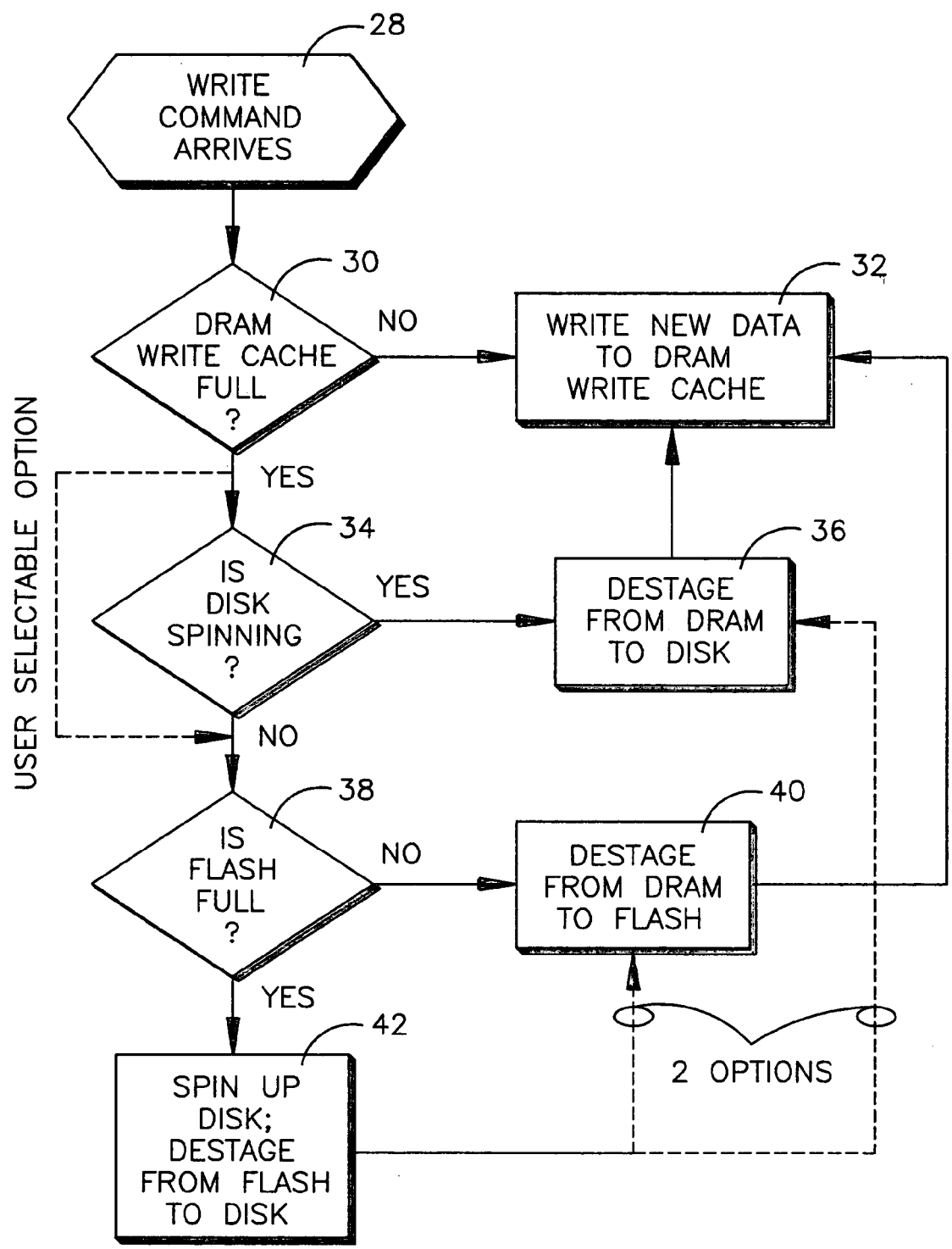
FIG. 2 is a flow chart of the write logic.

FIG. 2 shows the present write logic. Commencing at state 28, a write command arrives at the HDD controller. Proceeding to decision diamond 30 in response, it is determined whether the DRAM 20 is full. By determining whether a storage device is "full" is meant determining either whether the device is full to capacity, and/or determining whether the device has sufficient unused capacity remaining to hold the data requested to be written. If the DRAM is not full, the write is satisfied by writing the data to be written to the DRAM 20 at block 32.

On the other hand, if the DRAM 20 is full, the logic may proceed to decision diamond 34, to determine whether the disk 18 is spinning. By "spinning" is meant either whether the disk 18 is spinning at all, or whether it is simply not spinning at normal operating speed, or some other appropriate spinning test. In any case, if the disk is spinning the logic moves to block 36 to destage data from the DRAM 20 to the disk 18, and then to satisfy the write request using DRAM 20 at block 32. By "destaging" is meant moving data, so that, once moved from a device, the space in the device formerly occupied by the data is available for storage.

If it is determined at decision diamond 34 that the disk is not spinning, or if, in some embodiments, the user has been given the option of skipping decision 34 and has exercised that choice, the logic flows to decision diamond 38 to determine whether the flash memory device 22 is full. If it is not full, the logic proceeds to block 40 to destage data from the DRAM 20 to the flash memory device 22, and then to satisfy the write request using DRAM at block 32. On the other hand, if it is determined at decision diamond 38 that the flash memory device is full, the logic flows to block 42 to spin up the disk if not already spinning (it might be spinning if the user elected to skip decision diamond 34 and the disk had been spinning) and to destage data from the flash memory device 22 to the disk 18. The logic then destages data from DRAM 20 to flash memory device 22 at block 40 and satisfies the write request using DRAM 20 at block 32. Optionally, the logic can destage DRAM 20 directly to the disk 18 at block 36 and satisfy the write request using DRAM 20 at block 32.

Figure 3:
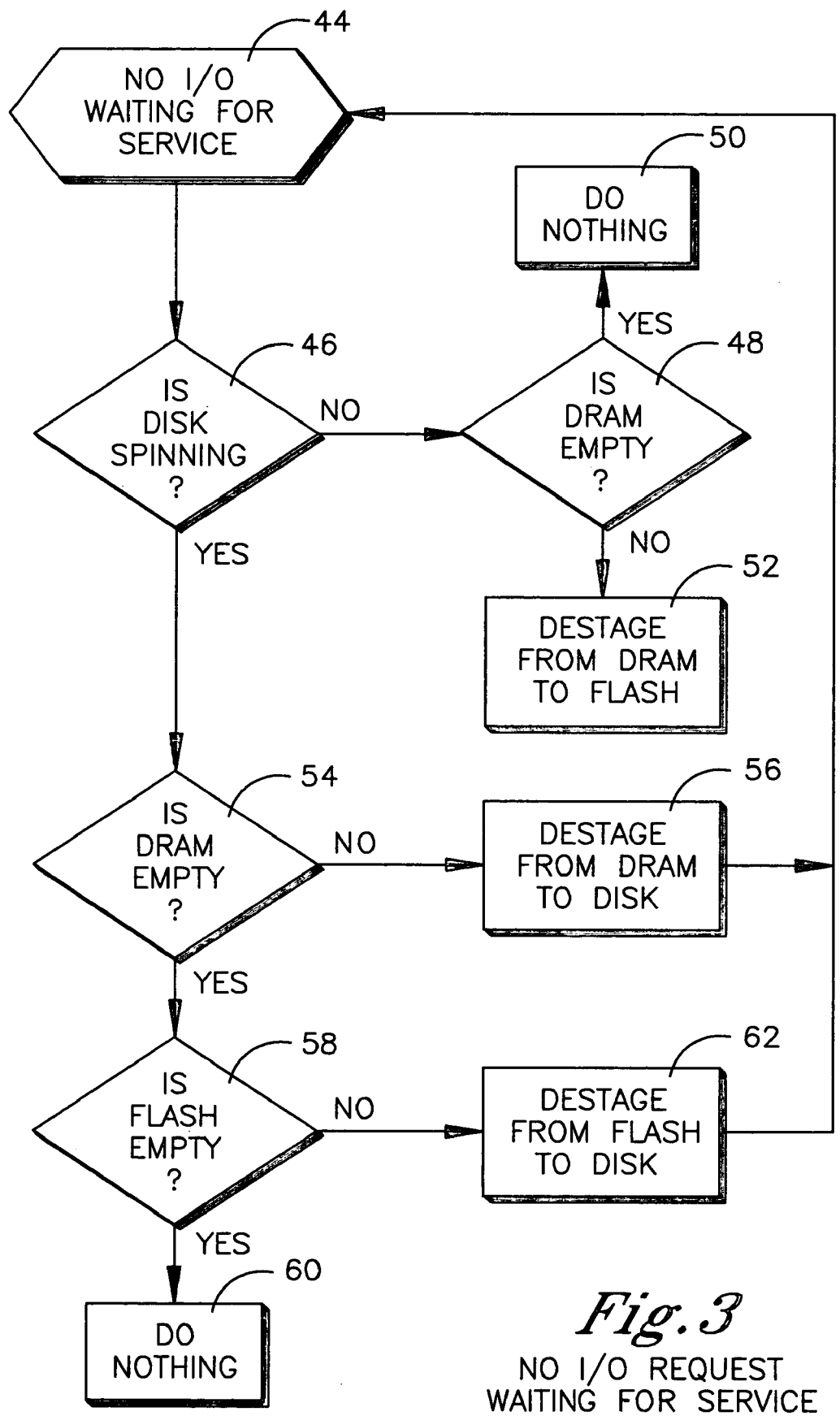
FIG. 3 is a flow chart of the data destaging logic when no write is pending.

FIG. 3 shows the logic that can be executed to manage data storage in the HDD 10 when a predetermined input/output (I/O) condition is met at state 44, such as the absence of any I/O commands in the queue. Proceeding to decision diamond 46, it is determined whether the disk 18 is spinning. If it is not, the logic flows to decision diamond 48 to determine whether the DRAM 20 is empty and if it is, nothing is done and the logic ends at state 50. Otherwise, all data in the DRAM 20 is destaged to the flash memory device 22 at block 52.

If, on the other hand, it is determined at decision diamond 46 that the disk 18 is spinning, the logic flows to decision diamond 54 to determine whether the DRAM 20 is empty, and if it is not the data in the DRAM 20 is destaged to the disk 18 at block 56. If the disk is spinning and the DRAM 20 is empty, however, the logic proceeds to decision diamond 58 to determine whether the flash memory device 22 is empty, and if it is nothing is done and the logic ends at state 60. Otherwise, the data in the flash memory device 22 is destaged to the disk 18 at block 62. The logic can return to state 44 from blocks 50, 52, 56, and 62.

It is to be understood that in the process of destaging data from the flash memory 22 to the disk 18, data may first be destaged from the flash memory device 22 to the DRAM 20 and then destaged from the DRAM 20 to the disk 18. This process can be executed in the event that the data rate of the flash memory 22 is slower than the media rate of the disk drive 18.

While the particular HDD HAVING BOTH DRAM AND FLASH MEMORY as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act". Absent express definitions herein, claim terms are to be given all ordinary and accustomed meanings that are not irreconcilable with the present specification and file history.

What is claimed is:

1. A hard disk drive (HDD), comprising:
   at least one disk storing data;
   at least one Dynamic Random Access Memory (DRAM) device;
   at least one flash memory device; and
   at least one disk controller managing data storage by executing logic including, at least in part:
      receiving a write request;
      determining whether the DRAM device is full and if not, writing data to the DRAM device to satisfy the write request; otherwise at least some of the time
      determining whether the flash memory device is full, and if not, destaging data from the DRAM device to the flash memory device and then writing data to the DRAM device to satisfy the write request, otherwise if the flash memory device is full spinning up the disk if not already spinning and destaging data from the flash memory device to the disk, then destaging data from the DRAM device to the flash memory device, then writing data to the DRAM device to satisfy the write request.

2. The HDD of claim 1, further comprising, prior to the act of determining whether the flash memory device is full, determining whether the disk is spinning and if so, destaging data from the DRAM device to the disk, and then writing data to the DRAM device to satisfy the write request, otherwise executing the act of determining whether the flash memory device is full.

3. The HDD of claim 2, wherein a user may select whether to execute the act of determining whether the disk is spinning.

4. The HDD of claim 1, wherein the HDD is a mobile HDD.

5. The HDD of claim 1, comprising a battery-powered host computer accessing the HDD.

6. The HDD of claim 1, wherein the disk controller manages data storage at least in part by executing logic comprising:
   determining whether an input/output (I/O) condition has been met, and if so:
      determining whether the disk is spinning and if not, destaging data that is stored in the DRAM device to the flash memory device, otherwise, if the disk is spinning, destaging data that is stored in the DRAM device to the disk;
      if the disk is spinning and the DRAM device is empty, destaging data that is stored in the flash memory device to the disk.

7. The HDD of claim 6, wherein the I/O condition is the absence of pending I/O requests.

8. A chip configured for placement within a hard disk drive (HDD) having at least one disk, the chip comprising:
   means for destaging data from a DRAM device to a flash memory device if the disk is not spinning;
   means for destaging data from the flash memory device to the disk if the disk is spinning, wherein the means for destaging data from the flash memory device to the disk executes if the DRAM device is empty and the disk is spinning, and if the disk is spinning and the DRAM device is not empty, data is destaged from the DRAM device to the disk;
   means for receiving a write request;
   means for, in response to the write request, determining whether the DRAM device is full and if not, writing data to the DRAM device to satisfy the write request; otherwise executing, at least for some write requests,
   means for determining whether the flash memory device is full, and if not, destaging data from the DRAM device to the flash memory device and then writing data to the DRAM device to satisfy the write request, otherwise spinning up the disk if not already spinning, destaging data from the flash memory device to the disk, then destaging data from the DRAM device to the flash memory device, then writing data to the DRAM device to satisfy the write request.

9. The chip of claim 8, further comprising means for determining whether the disk is spinning and if so, destaging data from the DRAM device to the disk, and then writing data to the DRAM device to satisfy the write request.

10. The chip of claim 9, comprising means for enabling a user to selectively invoke the means for determining whether the disk is spinning.

11. A computer readable medium bearing instructions to cause a processor to:
    manage data storage in a hard disk drive (HDD) having at least one rotatable disk, at least one non-volatile solid state memory device, and at least one volatile solid state memory device at least when power is available to the HDD, both when the disk is spinning and not spinning, wherein the processor manages data storage at least in part receiving a write request and in response thereto:
    determining whether the volatile memory device is full and if not, writing data to the volatile memory device to satisfy the write request; otherwise at least some of the time
    determining whether the non-volatile memory device is full, and if not, destaging data from the volatile memory device to the non-volatile memory device and then writing data to the volatile memory device to satisfy the write request, otherwise spinning up the disk if not already spinning and destaging data from the non-volatile memory device to the disk, then destaging data from the volatile memory device to the non-volatile memory device, then writing data to the volatile memory device to satisfy the write request.

12. The medium of claim 11, wherein the volatile memory device is DRAM device and the non-volatile memory device is a flash memory device.

13. The medium of claim 12, wherein the medium includes instructions to cause the processor, prior to determining whether the flash memory device is full, to determine whether the disk is spinning and if so, to destage data from the DRAM device to the disk, and then to write data to the DRAM device to satisfy the write request, otherwise to execute the act of determining whether the flash memory device is full.

14. The medium of claim 13, wherein a user may select whether to execute the act of determining whether the disk is spinning.

15. The medium of claim 11, wherein the HDD is a mobile HDD.

16. The medium of claim 11, comprising a battery-powered host computer accessing the HDD.

17. The medium of claim 12, wherein the act of managing data storage includes:
    determining whether an input/output (I/O) condition has been met, and if so:
       determining whether the disk is spinning and if not, destaging data that is stored in the DRAM device to the flash memory device, otherwise, if the disk is spinning, destaging data that is stored in the DRAM device to the disk;
       if the disk is spinning and the DRAM device is empty, destaging data that is stored in the flash memory device to the disk.

18. The medium of claim 17, wherein the I/O condition is the absence of pending I/O requests.

* * * * *